United States Patent [19]

Roeder

[11] Patent Number: 5,491,745

[45] Date of Patent: Feb. 13, 1996

[54] METHOD AND APPARATUS FOR A DUAL MODE KEYPAD PERMITTING ONE-TOUCH TELEPHONE NUMBER DIALING

[75] Inventor: G. R. Konrad Roeder, North Richland Hills, Tex.

[73] Assignee: Uniden America Corporation, Fort Worth, Tex.

[21] Appl. No.: 658,966

[22] Filed: Feb. 20, 1991

[51] Int. Cl.$^6$ .................................................. H04M 1/27
[52] U.S. Cl. .......................... 379/355; 379/356; 379/354; 379/58
[58] Field of Search ................................... 379/354, 355, 379/356, 58, 359

[56] References Cited

U.S. PATENT DOCUMENTS

| | | | |
|---|---|---|---|
| 3,993,877 | 11/1976 | Sendyk et al. | 379/355 |
| 4,277,651 | 7/1981 | Fisher, II et al. | 379/354 |
| 4,427,848 | 1/1984 | Tsakanikas | 379/97 |
| 4,567,326 | 1/1986 | Sato et al. | 379/355 |
| 4,613,730 | 9/1986 | Fechalos et al. | 379/355 |
| 4,661,976 | 4/1987 | Basch | 379/354 |
| 4,674,111 | 6/1987 | Monet et al. | 379/356 X |
| 4,707,854 | 11/1987 | Mayer | 379/355 X |
| 4,709,387 | 11/1987 | Masuda | 379/354 |
| 4,720,855 | 1/1988 | Ohnishi et al. | 379/354 |
| 4,723,265 | 2/1988 | Kamei et al. | 379/58 |
| 4,741,029 | 4/1988 | Hase et al. | 379/359 |
| 4,763,355 | 8/1988 | Cox | 379/355 |
| 4,775,997 | 10/1988 | West, Jr. et al. | 379/58 |
| 4,800,584 | 1/1989 | Kitanishi | 379/355 |
| 4,843,620 | 6/1989 | Hagedorn | 379/21 |
| 4,860,339 | 8/1989 | D'Agosto, III et al. | 379/355 |
| 4,860,349 | 8/1989 | Brown | 379/356 |
| 4,862,498 | 8/1989 | Reed | 379/355 |
| 4,866,764 | 9/1989 | Barker, III | 379/355 |
| 4,868,849 | 9/1989 | Tamaoki | 379/357 |
| 4,870,679 | 9/1989 | Hanna et al. | 379/114 |
| 4,885,762 | 12/1989 | Suzuki et al. | 379/58 |
| 4,907,264 | 3/1990 | Seiler et al. | 379/355 |
| 4,908,853 | 3/1990 | Matsumoto | 379/355 |
| 4,928,302 | 5/1990 | Kaneuchi et al. | 379/88 |
| 4,930,155 | 5/1990 | Kurokawa | 379/354 |
| 4,933,968 | 6/1990 | Iggulden | 379/216 |
| 4,941,172 | 7/1990 | Winebaum et al. | 379/355 |
| 4,947,424 | 8/1990 | Shaanan et al. | 379/355 |
| 4,964,159 | 10/1990 | Son | 379/356 |
| 5,157,719 | 10/1992 | Waldman | 379/355 |

FOREIGN PATENT DOCUMENTS

| | | | |
|---|---|---|---|
| 61-154340 | 7/1986 | Japan . | |
| 0288536 | 11/1990 | Japan | 379/355 |
| 2224619 | 5/1990 | United Kingdom | 379/355 |

*Primary Examiner*—Jeffery A. Hofsass
*Assistant Examiner*—Scott Wolinsky
*Attorney, Agent, or Firm*—Richards, Medlock & Andrews

[57] ABSTRACT

A method and apparatus for one-touch recall and dialing of stored telephone or billing account numbers using only the numeric and special keys of a standard 12-key keypad. Upon momentary actuation of a numeric or special key of a standard keypad, the data input is entered into a buffer or directly dialed into a telephone network. If, however, the actuated key is actuated for more than a predetermined amount of time, a previously stored sequence of numbers is retrieved from a memory address location corresponding to the actuated key and is automatically dialed.

3 Claims, 2 Drawing Sheets

METHOD AND APPARATUS FOR A DUAL MODE KEYPAD PERMITTING ONE-TOUCH TELEPHONE NUMBER DIALING

TECHNICAL FIELD OF THE INVENTION

The present invention pertains in general to telephone apparatus having dual mode keypad wherein a speed dialing function is activated with a standard keypad key without requiring additional function keys and, more particularly, to telephone apparatus which retrieves and dials previously stored telephone or billing account numbers by pressing one of the keys of a standard 12-key keypad.

BACKGROUND OF THE INVENTION

With prior art telephone apparatus, abbreviated dialing functions or redial functions were obtained by using function keys (SEND, RECALL, STORE, etc.) in combination with the numeric or digit keys (0–9), or by using combinations of the special keys (*, #) in combination with the numeric keys. As used herein, "function keys" refers to all keys other than numeric and special keys. Other telephone number recall devices have used a plurality of function keys alone for retrieval of stored telephone numbers or have required activation of a SEND key in order to dial a previously stored telephone number. Such techniques require the handset to include additional keys, as well as require the user to remember and implement the specific sequence of operations to carry out the abbreviated dialing function.

In accordance with these prior art telephone systems, function keys can be used to store in memory the data which has been entered into the memory buffer. For instance, when a number has been entered into a memory buffer, it can be stored at a particular memory address location by pressing the STORE function key and then entering the memory address on the keypad. Numbers entered in a memory buffer through use of the digit keys can then be sent to the dialer by pressing the SEND function key. Numbers can also be recalled and dialed from memory by pressing the RECALL key and then entering an address location on the keypad and then pressing the SEND function key. There are additional functions which can be executed by the controller, depending upon the function key or sequence of function keys pressed. Thus, when a calling party wishes to dial a number stored in the memory, prior art telephone systems would typically require that the calling party actuate a plurality of function keys, such as a RECALL key, one or several address KEYS and a SEND key, in order to dial the number stored in the memory. Other prior art telephone systems require that the calling party actuate one of a plurality of non-keypad keys which consolidate the RECALL, address and SEND functions into a single key.

With the foregoing in mind, it is an object of the invention to provide the ability to recall and dial previously stored telephone numbers or billing account numbers from memory by actuation of a single standard keypad key, thereby obviating the need for additional function keys or multiple step key activation. It is further desirable to provide a telephone number recall feature which does not reduce the number of functions performed by a standard keypad. Another objective of the present invention is to provide for one-touch dialing of telephone numbers which can be used on telephone systems which accumulate numbers before dialing, as well as on telephone systems which do not accumulate or collect numbers but instead dial entered numbers directly. A still further objective of the present invention is to provide for increased functionality of a standard 12-key keypad without increasing the number of keys—an objective which is important in certain devices such as cellular telephones and cordless telephones wherein the number of keys is limited by the minimum physical size requirements for the keys.

SUMMARY OF THE INVENTION

As will be explained below, the present invention provides for one-touch recall and dialing of previously stored telephone numbers by pressing a single key of a standard 12-key keypad for more than a predefined period of time. On the occurrence of such action, a telephone set controller accesses a memory location which is uniquely associated with the depressed key, and causes the outdialing of the telephone number prestored in such location.

In the embodiment of the present invention which uses only the twelve standard keypad keys for one-touch retrieving and dialing of stored number sequences, it will be appreciated that up to twelve number sequences may be stored for retrieval because only twelve memory address locations can be addressed with one-touch actuation of the twelve keys. If additional memory space is needed, the one-touch feature of the present invention can be extended to include the use of function keys in addition to the twelve standard keypad keys. Thus, additional memory locations can be addressed by actuating a function key for more than the predefined time. Alternatively, the number of memory address locations which can be addressed under the present invention can also be increased by using two numeric keys to specify the memory address of a particular number sequence, whereby the second of the two keys is actuated for more than the predefined time.

By providing for activation of the speed dialing feature by holding or depressing a standard keypad key for a time more than, for example, one second, a simplified recall and dial feature is obtained without eliminating the regular functions of the standard keypad keys. In addition to use in standard telephone systems and cellular telephone systems, the present invention can also be used in trunking systems, personal communications network systems, facsimile machines, land mobile systems, cordless telephone systems, conventional interconnect systems and many other telephone applications.

BRIEF DESCRIPTION OF THE DRAWINGS

For a more complete understanding of the present invention and the advantages thereof, reference is now made to the following description taken in conjunction with the accompanying drawings, in which.

DETAILED DESCRIPTION OF THE PREFERRED EMBODIMENTS

Figure 1:
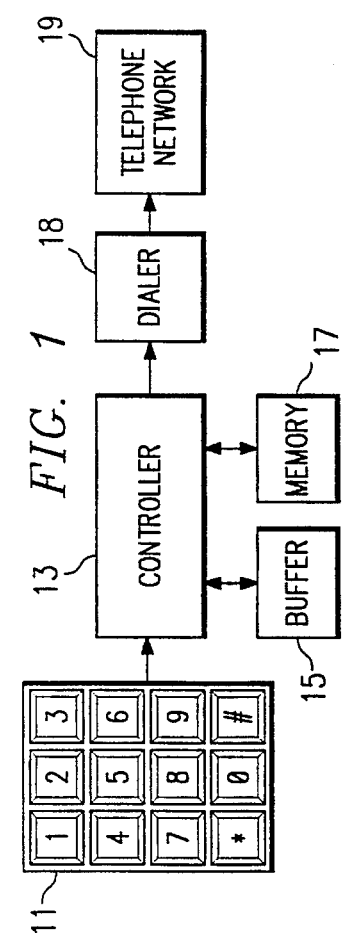
FIG. 1 is a block circuit diagram showing one embodiment of the telephone apparatus according to the present invention.

As shown in FIG. 1, one embodiment of the present invention uses a standard 12-key keypad 11 for inputting data corresponding to the digit or numeric keys (0–9) and special keys (*, #) of the keypad. A controller 13 is connected to receive the data input from the keypad 11 and is further connected to memory buffer 15 and memory 17 in which number or data sequences, such as telephone numbers, billing account numbers and other data, may be stored. The buffer 15 can be part of the memory 17 or can instead be separate and distinct from the memory 17. The stored numbers may be preprogrammed into the memory 17 by the telephone manufacturer, but are more likely to be entered by the user of the telephone apparatus, as will be described in greater detail later. Although the controller 13 is indicated generically in FIG. 1, the controller comprises computer software and circuitry for manipulating data, such as a central processing unit or microprocessor unit. The controller 13 is coupled to the dialer 18 which provides dial signals to the telephone network 19 in order to effect dialing of telephone numbers and billing account numbers as required by the controller 13.

As embodied in a telephone system which accumulates numbers in a memory buffer before dialing, the controller 13 of the present invention automatically enters any data input from a key on the keypad 11 into a memory buffer 15. Such a system is known as an accumulation-type system. Inherent in the notion of an accumulation dialer, numbers accumulated in the buffer are dialed or transmitted to the telephone network by activation of a SEND key. In accumulation-type systems, the controller 13 enters the number or performs the function corresponding to the keypad or function key pressed upon actuation of the key, but if the key is depressed or otherwise actuated for more than a predetermined time (such as one second), the present invention provides for one-touch dialing of numbers stored in the memory 17.

Although the predetermined amount of time could conceivably be set for any desired time period, the amount of time in the contemplated best mode would be one second. A one second decision period is long enough to avoid unintentional activation of the recall feature, but is short enough to provide for convenient activation without requiring the calling party to press a key for too long. The one second decision period is preferably implemented with a combination of hardware and software, such as a real time clock timer and software for counting the clock pulses, but can also be implemented with appropriate software alone, or with hardware alone.

Upon actuation of a key for more than one second, the controller 13 clears the buffer 15 of previously entered numbers, goes to an address location in memory 17 corresponding to the particular numeric or special key that was pressed, retrieves a previously stored telephone number or billing account number from that memory address location, and causes the dialer 18 to dial the retrieved telephone number into the network 19.

In operation, the telephone apparatus shown in FIG. 1 receives data input from the keypad 11 when one of the keypad keys is pressed or "actuated." For instance, upon actuation of the "1" key, the controller 13 enters a 1 into the buffer 15. But if a "1" key is held down for more than one second, corresponding memory address "01" is accessed and the number sequence stored there is retrieved and dialed. Similarly, if the "0" key is actuated for more than one second, the memory address "10" is addressed, and if the "*" key is actuated for over one second, memory location "11" is addressed. If memory location "12" had stored therein the phone number "555–1234," actuation of the "#" key for more than one second would cause the controller 13 to retrieve the number stored in memory address location "12," and that retrieved number (555–1234) would then be dialed out to the network 19 by dialer 18.

The controller 13 can transmit the retrieved telephone number directly to the dialer 18, or can instead clear the buffer 15 and load the buffer with the retrieved telephone number before activating the dialer 18. Thus, if a keypad key is pressed for less than one second, the numeric or special key data from the keypad 11 is entered directly into the buffer 15 by controller 16 for subsequent dialing, but if the key is depressed for more than one second, the controller 13 retrieves a telephone number from a memory address location in memory 17 corresponding to the depressed keypad key, and causes the dialer 18 to dial the retrieved number.

The dialer 18 may be any device which provides dial signals—pulse, dual tone multi-frequency (DTMF), any of the cellular dialing protocols, etc.—to a telephone network 19 from the telephone apparatus. Thus, any device which translates numeric information for transmission to a telephone network 19 meets the requirements of a dialer.

Figure 2:
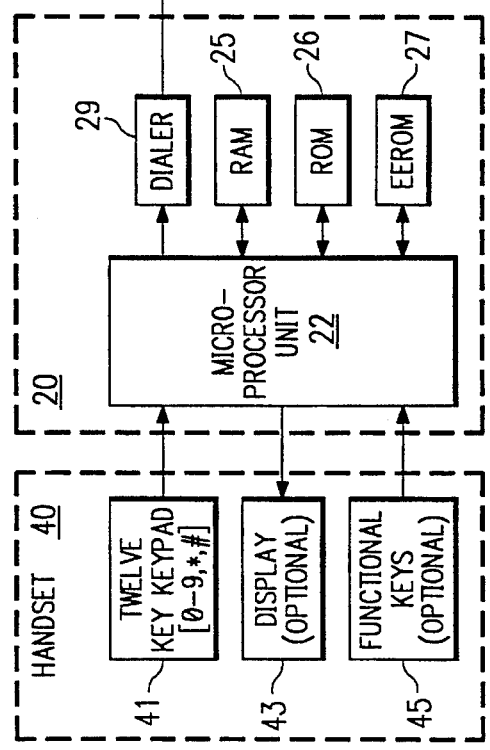
FIG. 2 is a block circuit diagram showing a preferred embodiment for a standard telephone system utilizing the present invention.

An alternative embodiment of the present invention is shown in FIG. 2 in which the telephone system does not accumulate numbers in a buffer before dialing, but instead automatically dials an entered number upon entry from the keypad. Such a system is known as a non-accumulation system. In non-accumulation-type systems, the microprocessor controller 22 enters the number or performs the function corresponding to the keypad or function key pressed when the key is released. Thus, if the key is released before the predetermined time expires, the keypad and function keys operate normally, but if released after the predetermined time expires, the dialing sequence in a memory address location corresponding to the pressed key is retrieved and sent to the dialer 29 for dialing to the telephone network 19. As shown in FIG. 2, the handset 40 in this non-accumulation dialer includes a standard 12-key keypad 41 having numeric and special keys (0–9, *, #), and optionally includes a display 43 for showing the numbers being dialed and function keys 45, such as STORE, SEND, RECALL, FUNCTION, END, REDIAL or CLEAR keys. Of course, any or all of these elements might not be physically located on the handset 40, but might instead be located on the handset base 20. The handset components are coupled to a microprocessor unit 22 which serves some of the same functions as the controller 13 for the telephone apparatus shown in FIG. 1. Associated with the microprocessor controller 22 is RAM memory 25, ROM memory 26 and EEROM memory 27. The microprocessor unit 22 is further coupled to a dialer 29 which provides appropriate dial signals to a telephone network 19.

In the embodiment of the present invention shown in FIG. 2, any data input from the 12-key keypad 41 is automatically dialed by dialer 29 when the key is released. As the numeric and special keys are pressed and released, the microprocessor controller 22 displays the numbers being dialed on display 43 while causing the dialer 29 to provide dial signals corresponding to the activated keypad key. However, if one of the numeric or special keys on the keypad 41 is pressed for more than one second (i.e., released after one second has expired), the microprocessor 22 retrieves a previously stored dialing sequence from a memory address location in the RAM 25, ROM 26 or EEROM 27 corresponding to the key which was depressed, and then causes the dialer 29 to dial the retrieved dialing sequence to the telephone network 19. In a non-accumulation system in which the microprocessor 22 bases any decision on how to implement depressed keys upon the release time (as opposed to the key actuation), successive dialing sequences stored in the memory can be retrieved and sequentially dialed, thereby allowing telephone and billing account numbers to be sequentially dialed.

In one embodiment of the present invention involving a non-accumulation telephone apparatus, any numbers which were dialed prior to activation of the one-touch dialing feature may be cleared from the network 19 by microprocessor 22 causing the telephone apparatus to momentarily switch to an "on hook" condition, thereby hanging up the telephone line before dialing the retrieved number to effectively eliminate the earlier-dialed numbers. While this arrangement solves the problem of clearing earlier-dialed numbers, it presents difficulties with retrieving two different numbers from memory for successive dialing (i.e., a phone number followed by a billing account number) because of the "on hook" disconnection problem. To solve this problem, the microprocessor controller 22 in one embodiment of the present invention recognizes when successive telephone numbers are recalled from the memory by actuating two or more successive keys for more than the predetermined time and, for any of the succeeding numbers recalled from memory, the microprocessor 22 does not cause the dialer to switch "on hook" prior to dialing such succeeding numbers. Thus, the microprocessor controller 22 causes the telephone apparatus to switch "on hook" prior to dialing the first retrieved number, but does not switch "on hook" for the second or succeeding numbers.

Figure 3:
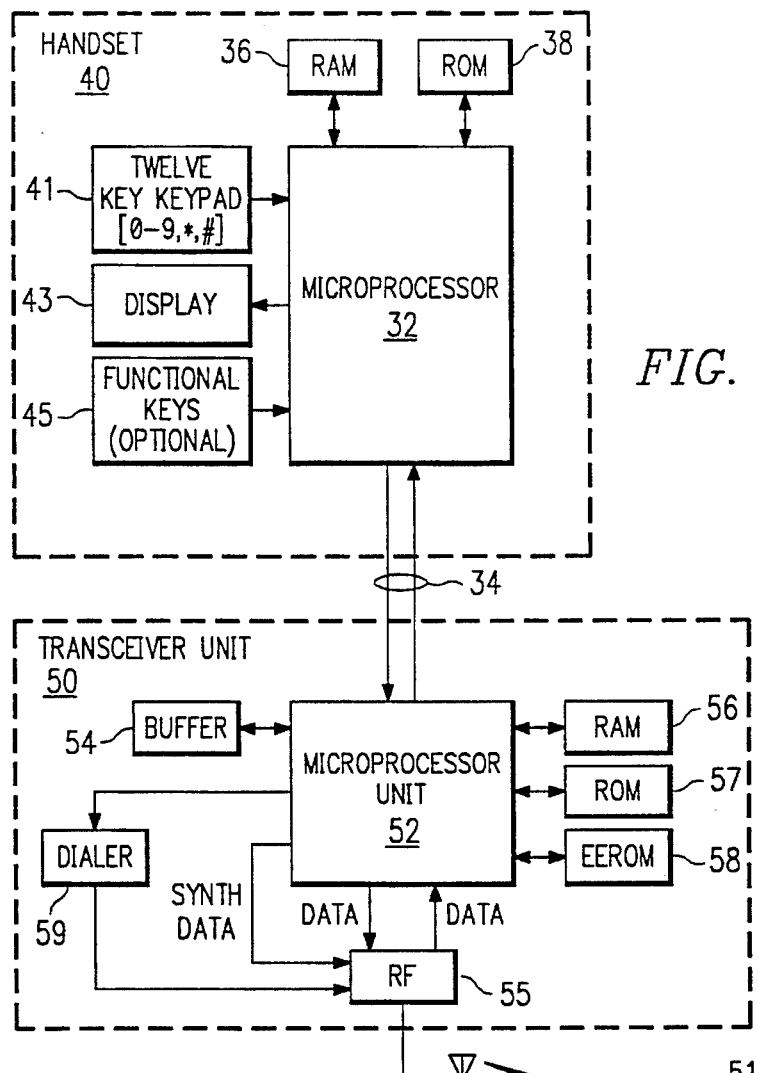
FIG. 3 is a block circuit diagram showing one embodiment of the present invention as utilized in a cellular telephone system.

In another embodiment of the present invention relating to cellular telephone systems as shown in FIG. 3, the present invention includes a handset 40; its microprocessor 32 with its associated RAM memory 36 and ROM memory 38; transceiver unit 50; transceiver microprocessor 52 with its associated buffer 54, RAM 56, ROM 57 and EEROM 58. Again, the buffer 54 can be either separate from or a part of RAM 56. The handset microprocessor 32 communicates with the transceiver microprocessor 52 through a serial or parallel bus 34. The bus 34 can be implemented with cable connectors, radio frequency transmission technology, or any other suitable means. Transceiver microprocessor 52 is also coupled to radio frequency transceiver 55 for converting data into radio signals. The radio signals in this cellular telephone embodiment of the present invention are transmitted by the radio frequency transceiver 55 to the radio frequency receiver 51 and eventually communicated to the telephone network 19.

Cellular telephones, like the one shown in FIG. 3, typically include a handset unit and a transceiver unit, both of which may have microprocessor and memory components. Such systems are usually accumulation type systems. In such cellular systems, the controller function may be implemented with either the handset microprocessor 32 or the transceiver microprocessor 52, or the controller function can be shared or allocated between the two microprocessors. In other types of cellular systems, such as portables, there may be only one microprocessor which implements all of the controller's functions. In a preferred embodiment of the present invention relating to mobile cellular phones, the transceiver microprocessor 52 and buffer 54 are used for entering and storing data input from the keypad 41. As data is stored in the buffer 54, the transceiver microprocessor 52 causes the stored data to be shown on display 43.

The necessity of using function keys or multiple step key punching in cellular telephone systems to recall and dial stored numbers is eliminated with the present invention which provides for one-touch dialing. One-touch retrieval and dialing of telephone numbers or billing account numbers from the handset memory 36, 38 or transceiver memory 56, 57, 58 is achieved by pressing one of the numeric or special keys of the standard keypad 41 for more than one second. While a one second period appears to be optimal, other time periods can be utilized. When a key has been depressed for more than one second, the transceiver microprocessor controller 52 retrieves a previously stored telephone number or dialing sequence from a memory location corresponding to the pressed keypad key and causes the dialer 59 to provide dial signals to the telephone network 19 corresponding to the retrieved number or sequence. Again, the microprocessor controller 52 can send the retrieved telephone number directly to the dialer 59, or can instead clear the memory buffer 54, store the retrieved number in the cleared buffer 54 and then initiate the dialing process.

Figure 4:
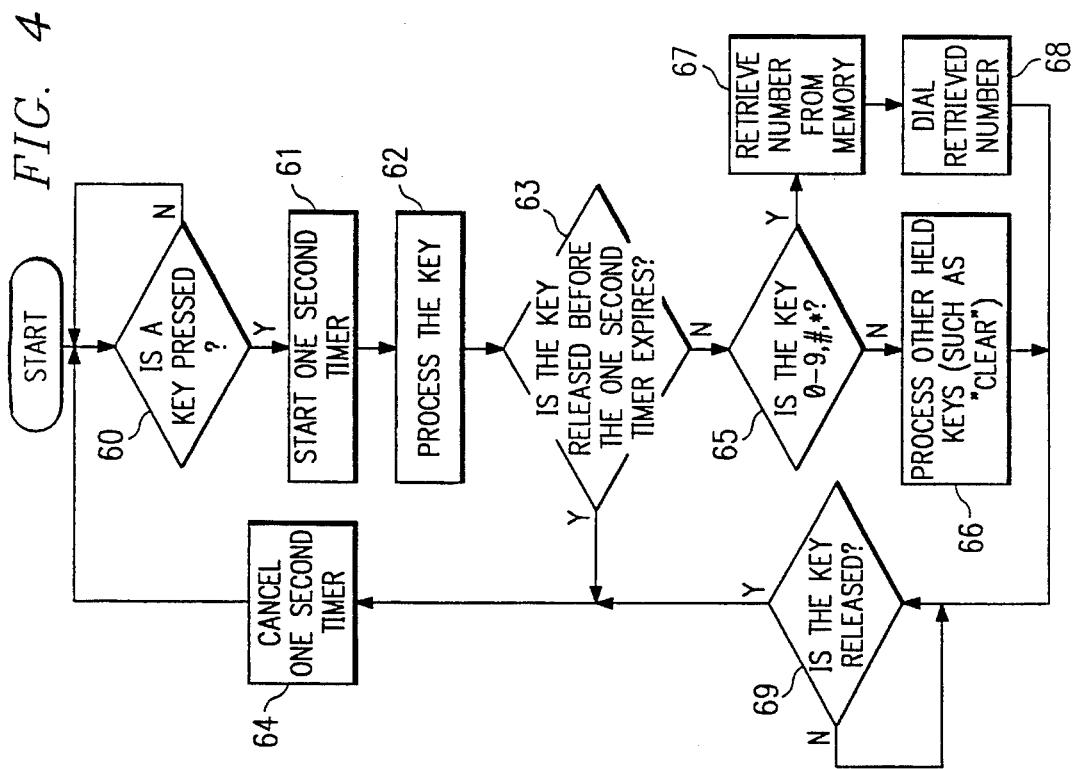
FIG. 4 is a flow chart illustrating the operation of the telephone apparatus in one embodiment of the present invention.

In the circuitry described above for embodiments of the present invention wherein the key data or function is executed upon actuation of the key (not upon release), the controller executes a program as shown in the flow chart of FIG. 4. The following description of the flow chart of FIG. 4 is given with reference to an accumulation-type system as shown in the block diagram of FIG. 1. Upon recognizing that a numeric or special key from a standard 12-key keypad 11 has been depressed (logic block 60), the controller 13 starts a one-second timer (function block 61) and executes the function of the pressed key (function block 62). For instance, if the pressed key is a numeric "1," a 1 is entered into the buffer 15. Alternatively, if the pressed key is a function key, the particular function is executed by the controller 13. While this flow chart has been described with reference to systems which execute the key data or function upon actuation of the key, it should be clear to those skilled in the art that a flow chart for a system which executes key data and function upon release of the keypad key would very similar to the flow chart of FIG. 4.

The controller 13 then determines whether the key has been released before the one-second timer has expired (logic block 63). If so, the timer is cancelled (function block 64) and the controller is placed back into its initial state. However, if the key is not released before the one-second timer expires, the controller 13 determines whether the pressed key is one of the numeric (0–9) or special (*, #) keys (logic block 65). If the pressed key is not one of the numeric or special keys, it must be a function key and the function corresponding to a particular function key depressed for more than one second is executed by the controller 13 (function block 66). However, if the pressed key is a numeric or special key, the controller 13 goes to a memory address location corresponding to the key that was pressed and retrieves from that location the number which was previously stored at such location (function block 67). The controller 13 then causes the dialer 59 to dial the retrieved number to the telephone network 19 (function block 68). Once the key is released (logic block 69), the program returns to its initial state.

In addition to using numeric and special keys for retrieval and dialing, the controller 13 may also be programmed so that function keys can serve to retrieve and dial numbers from memory if the function key is actuated for more than one second. Thus, the present invention can by used with any one of a plurality of keys on the handset. It should be appreciated that any controller will probably be performing a number of additional functions besides monitoring the keypad inputs so that the controller may only periodically check the status of keypad entries.

In each of the flow chart steps in which a key is processed, the controller 13 can use subroutines to accomplish the desired function. For instance, upon initial actuation of a numeric or special key of the embodiment shown in FIG. 1, a subroutine would display that character in a display, store the number in a buffer 15, and if the telephone is a non-accumulation dialer, dial the number into the telephone network 19. Upon actuation of a function key, the particular function would be executed by a subroutine, such as clearing one digit from the buffer when the CLEAR key is pressed, or performing the relevant functions when the STORE, RECALL, REDIAL, SEND, END, or FUNCTION keys are actuated.

Similarly, the controller 13 could use subroutines to execute any function called for when a numeric, special or function key has been pressed for more than the predetermined time. Thus, a subroutine could clear the display and buffer 15 before recalling a number from a memory location associated with the depressed numeric or special key. A separate subroutine could also initiate and control the dialing process as handled through the dialer 59. The controller 13 could also use subroutines to control and execute other functions for the function keys which have been depressed for longer than the predetermined time.

Figure 5:
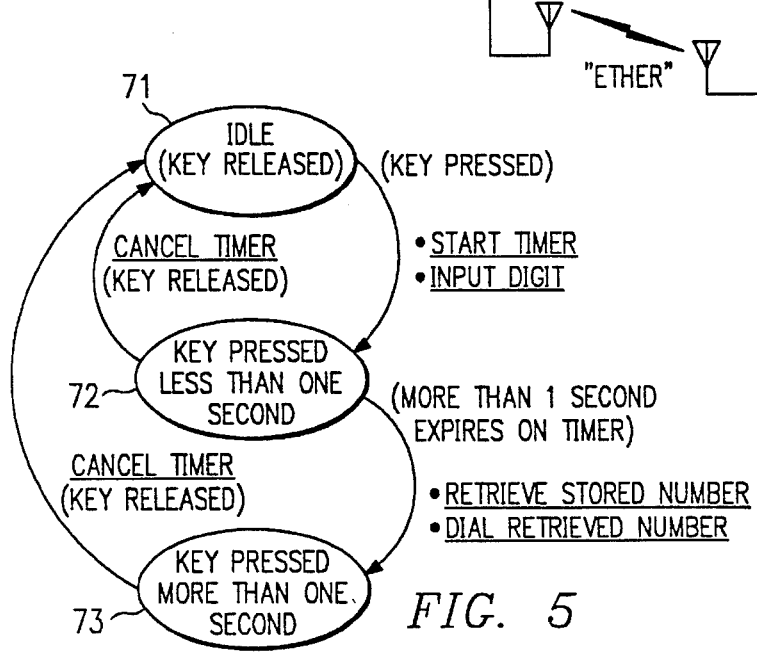
FIG. 5 is a state diagram showing how the present invention can be implemented using a state machine having three states and four actions during state transfer.

A number of software programs can be used by the controller 13 to obtain the one-touch recall feature of the present invention and these other programs may differ in implementation from the flow chart shown in FIG. 4. As a generalized description of the present invention, the state diagram shown in FIG. 5 should describe the basic features of the present invention. From an initial state 71 in which all keys are released and the keypad is otherwise idle, a transition to a second state 72 is caused by pressing any key, at which time a timer is started and the key is processed (i.e., the digit is entered or dialed, or the function key is implemented). If the key is released before the one-second timer expires, the system returns to the initial idle state 71. But if the key is pressed for more than one second (i.e., more than one second expires on the timer), the system transitions to a third state 73 wherein a previously stored number is retrieved from a memory location corresponding to the pressed key and then the number is automatically dialed. The system remains in the third state until the key is released, at which time the timer is cancelled and the system returns to the initial idle state 71.

Thus the present invention provides a way to increase the functionality of the standard 12-key keypad without increasing the number of keys, which is important in portable cellular phones or cordless phones wherein the number of keys is generally limited due to the physical size required for the keys. The one-touch feature also provides an extremely efficient method of retrieving and dialing stored telephone numbers. According to this method, the calling party would simply press a numeric or special key of a standard 12-key keypad. The numeric or special key data would automatically be entered into a buffer and/or display for subsequent dialing. However, if the calling party presses the key for more than one second, a previously stored telephone number would be retrieved from a memory address location corresponding to the pressed keypad key and the retrieved telephone number would be automatically dialed.

Although the retrieved telephone number could be stored in a redial buffer so that it could be redialed upon actuation of the REDIAL function key, this would clearly be unnecessary since the stored telephone number can also be recalled for dialing by pressing the corresponding keypad key for more than one second. Thus, the retrieved telephone number need not be stored in the recall buffer or even in any storage buffer if the dialer is a non-accumulation type of dialer.

In accordance with one embodiment of the present invention, the memory locations from which the telephone and billing account numbers are retrieved with the one-touch feature can be part of the main memory, or can be a special one-touch memory which is completely separate and distinct from the main memory storage of the telephone apparatus. If separate memories are used, number sequences could be stored in the one-touch memory locations 0–9, *, # by inputting an address and pressing the FUNCTION and STORE keys; and can be stored in the main memory by using the STORE key alone. Number sequences in the one-touch memory address locations could be retrieved by pressing the corresponding numeric or special keys for more than one second, while the main memory address locations could be retrieved by entering the address and pressing the RECALL and SEND keys.

Although several embodiments of the present invention have been illustrated in the accompany drawings and described in the foregoing Detailed Description, it will be understood that the invention is not limited to the embodiments disclosed, but is capable of numerous rearrangements, modification and substitutions without departing from the scope of the invention, and is further intended to encompass any changes which might be made by one skilled in the art of telephone design.

What is claimed is:

1. A one-touch telephone number dialing system, comprising:

a keypad comprising a plurality of numeric keys and special function keys for inputting data corresponding to a selected key;

a memory having a plurality of memory locations for storing at least one sequence of data, each location corresponding to one of the keypad keys;

a buffer for receiving data from the keypad and for receiving a sequence of data from the memory;

a dialer for transmitting dial signals from the system; and a controller for entering into the buffer data from the keypad upon actuation of a corresponding keypad key, and, if the corresponding keypad key is held down for more than a predetermined time period, for clearing the buffer, retrieving a sequence of data from one of said memory locations corresponding to the actuated keypad key, entering the retrieved sequence of data into the buffer, and enabling the dialer to dial the retrieved sequence of data.

2. A one-touch telephone number dialing system, comprising:

a keypad comprising a plurality of numeric keys and special function keys;

a buffer for storing data and dialing sequences;

a dialer for transmitting dial signals from the system;

a memory having a plurality of memory address locations for storing at least one dialing sequence, each memory address location associated with a particular keypad key; and a controller coupled to the buffer and keypad for storing in the buffer data uniquely corresponding to an actuated keypad key and determining whether the actuated keypad key is released within a predetermined time period from actuation of the key, said controller further coupled to the dialer and memory to retrieve a dialing sequence from one of said memory address locations corresponding to the actuated keypad key, to store the retrieved dialing sequence in the buffer and to cause the dialer to transmit a dial signal corresponding to the retrieved dialing sequence if the actuated keypad key is not released within said predetermined time period.

3. The system of claim 2, wherein said system is comprised by a cellular telephone apparatus.

* * * * *